United States Patent
Suzuki

(10) Patent No.: US 9,792,950 B2
(45) Date of Patent: Oct. 17, 2017

(54) PROGRAM, INFORMATION STORAGE MEDIUM, IMAGE PROCESSING DEVICE, IMAGE PROCESSING METHOD, AND DATA STRUCTURE

(75) Inventor: Tatsuya Suzuki, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 327 days.

(21) Appl. No.: 13/203,411

(22) PCT Filed: Oct. 29, 2009

(86) PCT No.: PCT/JP2009/068565
§ 371 (c)(1),
(2), (4) Date: Sep. 12, 2011

(87) PCT Pub. No.: WO2010/106706
PCT Pub. Date: Sep. 23, 2010

(65) Prior Publication Data
US 2012/0014658 A1 Jan. 19, 2012

(30) Foreign Application Priority Data
Mar. 19, 2009 (JP) .................................. 2009-067337

(51) Int. Cl.
*H04N 5/91* (2006.01)
*G11B 27/00* (2006.01)
(Continued)

(52) U.S. Cl.
CPC ............ *G11B 27/007* (2013.01); *A63F 13/10* (2013.01); *A63F 13/497* (2014.09);
(Continued)

(58) Field of Classification Search
CPC ...... A63F 13/10; A63F 13/12; A63F 2300/50; A63F 2300/8017; A63F 2300/636;
(Continued)

(56) References Cited

U.S. PATENT DOCUMENTS 5,558,339 A * 9/1996 Perlman .................. A63F 13/12
463/23
5,842,929 A * 12/1998 Moody .................... A63D 5/04
473/70

(Continued)

FOREIGN PATENT DOCUMENTS

EP 1746822 A1 1/2007
EP 2000190 A2 12/2008
(Continued)

OTHER PUBLICATIONS

International Preliminary Report on Patentability for corresponding Application No. PCT/JP2009/068565, dated Oct. 18, 2011.

(Continued)

*Primary Examiner* — Thai Tran
*Assistant Examiner* — Stephen Smith
(74) *Attorney, Agent, or Firm* — Matthew B. Dernier, Esq.

(57) ABSTRACT

To provide a program, an information storage medium, an image processing device, an image processing method, and a data structure capable of collaboration between replay data and a motion picture produced by an image capturing unit during a period corresponding to the replay data. A replay data obtaining unit obtains replay data for reproducing the status of execution of a program. A captured motion picture obtaining unit obtains a captured motion picture that is produced by the image capturing unit during an image capturing period including at least a part of a reproduction period in which the status of execution of the program is reproduced based on replay data. A data holding unit holds replay data and a captured motion picture so as to be correlated to each other.

12 Claims, 6 Drawing Sheets

(51) Int. Cl.
    *A63F 13/655* (2014.01)
    *A63F 13/40* (2014.01)
    *H04N 5/77* (2006.01)
    *H04N 5/783* (2006.01)
    *A63F 13/497* (2014.01)
    *A63F 13/86* (2014.01)
    *A63F 13/213* (2014.01)

(52) U.S. Cl.
    CPC ............ *A63F 13/655* (2014.09); *A63F 13/86* (2014.09); *H04N 5/772* (2013.01); *H04N 5/783* (2013.01); *A63F 13/213* (2014.09); *A63F 2300/577* (2013.01); *A63F 2300/634* (2013.01)

(58) Field of Classification Search
    CPC .......... A63F 2300/695; A63F 2300/634; A63F 2300/577; G11B 27/007; H04N 5/772; H04N 5/783
    USPC ........... 345/473; 386/201, 224, 248; 463/25, 463/30–32, 42–43, 70
    See application file for complete search history.

(56) References Cited

U.S. PATENT DOCUMENTS

| | | | |
|---|---|---|---|
| 6,183,367 B1 | 2/2001 | Kaji | |
| 6,289,165 B1* | 9/2001 | Abecassis | G11B 19/02 348/E5.105 |
| 6,306,039 B1* | 10/2001 | Kaji | A63F 13/12 345/418 |
| 6,419,581 B2* | 7/2002 | Asai | A63F 13/10 463/32 |
| 6,724,385 B2 | 4/2004 | Takatsuka | |
| 6,835,137 B1* | 12/2004 | Nakamura | A63F 13/10 463/42 |
| 8,177,647 B2* | 5/2012 | Acres | G07F 17/32 463/43 |
| 8,591,332 B1* | 11/2013 | Bright | A63F 13/53 273/460 |
| 2008/0139301 A1* | 6/2008 | Holthe | A63F 13/00 463/25 |
| 2008/0268961 A1* | 10/2008 | Brook | A63F 13/12 463/42 |
| 2008/0274798 A1* | 11/2008 | Walker | G07F 17/32 463/25 |
| 2009/0118019 A1* | 5/2009 | Perlman | A63F 13/12 463/42 |
| 2009/0258708 A1* | 10/2009 | Figueroa | A63F 13/49 463/43 |
| 2009/0267956 A1* | 10/2009 | Greaves | G06F 9/4443 345/555 |
| 2009/0280895 A1* | 11/2009 | Yamaoka | A63F 13/00 463/30 |
| 2010/0035691 A1* | 2/2010 | Wild | H04L 67/24 463/42 |
| 2010/0115417 A1* | 5/2010 | Cox | G06F 21/305 715/740 |
| 2010/0210351 A1* | 8/2010 | Berman | G07F 17/3246 463/25 |
| 2011/0151975 A1 | 6/2011 | Mori | |

FOREIGN PATENT DOCUMENTS

| | | |
|---|---|---|
| JP | 8141208 A | 4/1996 |
| JP | 11235464 A | 8/1999 |
| JP | 11244531 A | 9/1999 |
| JP | 11244538 A | 9/1999 |
| JP | 2000051518 A | 2/2000 |
| JP | 2001325612 A | 11/2001 |
| JP | 2002085827 A | 3/2002 |
| JP | 2002360935 A | 12/2002 |
| JP | 2004041645 A | 2/2004 |
| JP | 2004313402 A | 11/2004 |
| JP | 2007259881 A | 10/2007 |
| JP | 2009061180 A | 3/2009 |
| JP | 2009193001 A | 8/2009 |
| WO | 0007091 A1 | 2/2000 |

OTHER PUBLICATIONS

Office Action for Japanese Patent Application No. 2009-067337 dated Feb. 7, 2012.
International Search Report for corresponding Application PCT/JP2009/068565, dated Dec. 22, 2009.
Office Action for Japanese Patent Application No. 2009-067337 dated Jan. 8, 2013.
Office Action for Japanese Patent Application No. 2009-067337 dated Nov. 5, 2013.
International Search Report for corresponding EP Application 09841908.8, 10 pages, dated Mar. 14, 2016.

* cited by examiner

PROGRAM, INFORMATION STORAGE MEDIUM, IMAGE PROCESSING DEVICE, IMAGE PROCESSING METHOD, AND DATA STRUCTURE

TECHNICAL FIELD

The present invention relates to a program, an information storage medium, an image processing device, an image processing method, and a data structure.

BACKGROUND ART

Game devices for producing replay data for reproducing the status of execution of a game have been available, in which the replay data includes operation data (an operation log) indicating a time of user operation of a controller or identifying a button operated, and position data indicating a position of an object, such as a character, in each frame, and so forth. Patent Document 1 describes a game device capable of replaying a game. Some of such game devices produce a replay motion picture of a game, based on replay data, and show on a display or the like.

PRIOR ART DOCUMENT

Patent Document

Patent Document 1: U.S. Pat. No. 6,724,385, specification

In displaying a replay motion picture of a game on a display or the like, additional displaying of a motion picture showing a user playing a game may allow a viewer of the replay motion picture to enjoy watching the user enthusiastically playing a game as well as the game being replayed.

Not only with a game device but also with an image processing device in general, it is expected that collaboration between replay data and a motion picture that is produced by an image capturing means such as a camera during a period corresponding to the replay data may enhance amusingness of the motion picture produced.

SUMMARY OF THE INVENTION

The present invention has been conceived in view of the above, and aims to provide a program, an information storage medium, an image processing device, an image processing method, and a data structure capable of collaboration between replay data and a motion picture produced by an image capturing means during a period corresponding to the replay data.

In order to achieve the above described object, according to one aspect of the present invention, there is provided a program for causing a computer to function as a replay data obtaining unit for obtaining replay data for reproducing the status of execution of a program; a captured motion picture obtaining unit for obtaining a captured motion picture produced by an image capturing unit during an image capturing period including at least a part of a reproduction period in which the status of execution of the program is reproduced based on the replay data; and a unit for holding the replay data and the captured motion picture in a holding unit so as to be correlated to each other.

According to another aspect of the present invention, there is provided an image processing device comprising a replay data obtaining unit for obtaining replay data for reproducing the status of execution of a program; a captured motion picture obtaining unit for obtaining a captured motion picture produced by image capturing unit during an image capturing period including at least a part of a reproduction period in which the status of execution of the program is reproduced based on the replay data; and a holding unit for holding the replay data and the captured motion picture so as to be correlated to each other.

According to still another aspect of the present invention, there is provided an image processing method comprising a replay data obtaining step of obtaining replay data for reproducing the status of execution of a program; a captured motion picture obtaining step of obtaining a captured motion picture produced by image capturing unit during an image capturing period including at least a part of a reproduction period in which the status of execution of the program is reproduced based on the replay data; and a step of holding the replay data and the captured motion picture in a holding unit so as to be correlated to each other.

According to yet another aspect of the present invention, there is provided a data structure comprising replay data for reproducing the status of execution of a program; and a captured motion picture produced by an image capturing unit during at least a part of a period corresponding to the replay data, wherein the replay data is correlated to the captured motion picture.

According to the present invention, as replay data and a captured motion picture are held so as to be correlated to each other, it is possible to achieve collaboration between replay data and a captured motion picture that is produced by an image capturing means during a period corresponding to the replay data.

A program according to an embodiment of the present invention may cause a computer to function further as a motion picture for playback producing unit for producing a motion picture for playback based on the replay data and the captured motion picture. With the above, as a motion picture for playback is produced based on replay data and a captured motion picture, it is possible to produce a motion picture achieved through collaboration between replay data and a captured motion picture that is produced by an image capturing means during a period corresponding to the replay data.

According to a program in this embodiment, the motion picture for playback producing unit may playback a motion picture that is based on the replay data and the captured motion picture to thereby produce the motion picture for playback. With the above, it is possible to utilize the motion picture which is played back in production of a motion picture for playback.

According to a program according to an embodiment of the present invention, the motion picture for playback producing unit may produce a motion picture for playback, based on a replay motion picture produced based on replay data and a captured motion picture. With the above, it is possible to utilize a motion picture that is based on replay data in production of a motion picture for playback.

According to a program in this embodiment, the motion picture for playback producing unit may combine the replay motion picture and the captured motion picture according to a predetermined rule to thereby produce a motion picture for playback. With the above, it is possible to produce a motion picture for playback resulting from combing a replay motion picture and a captured motion picture according to a predetermined rule.

According to a program in this embodiment, the motion picture for playback producing unit may combine the replay motion picture and the captured motion picture according to a rule that is determined based on the replay motion picture to thereby produce a motion picture for playback. With the above, it is possible to produce a motion picture for playback resulting from combining a replay motion picture and a captured motion picture according to a rule that is determined based on the replay motion picture.

A program in this embodiment may cause a computer to function further as a rule changing unit for changing the rule for combining the replay motion picture and the captured motion picture according to a user operation. With the above, a user can control a rule for combining a replay motion picture and a captured motion picture.

A program according to an embodiment of the present invention may cause a computer to function further as a motion picture for playback output unit for outputting, in response to a request from a user, the motion picture for playback so as to be correlated to an identifier of the user to a motion picture output server for outputting a motion picture. With the above, a user who can access the motion image output server can view a motion picture for playback having been output to the motion picture output server.

According to a program according to an embodiment of the present invention, the replay data may describe at least content of an operation carried out by a user. With the above, it is possible to produce a motion picture for playback that is based on content of an operation carried out by a user.

According to a program according to an embodiment of the present invention, the image capturing period may be a period longer than the reproduction period. With the above, it is possible to produce a motion picture for playback that is based on a captured motion picture that is captured during an image capturing period not included in a reproduction period.

Any of the above described programs can be stored in a computer readable information storage medium.

DETAILED DESCRIPTION OF THE PREFERRED EMBODIMENTS

In the following, one embodiment of the present invention will be described in detail with reference to the accompanying drawings.

Figure 1:
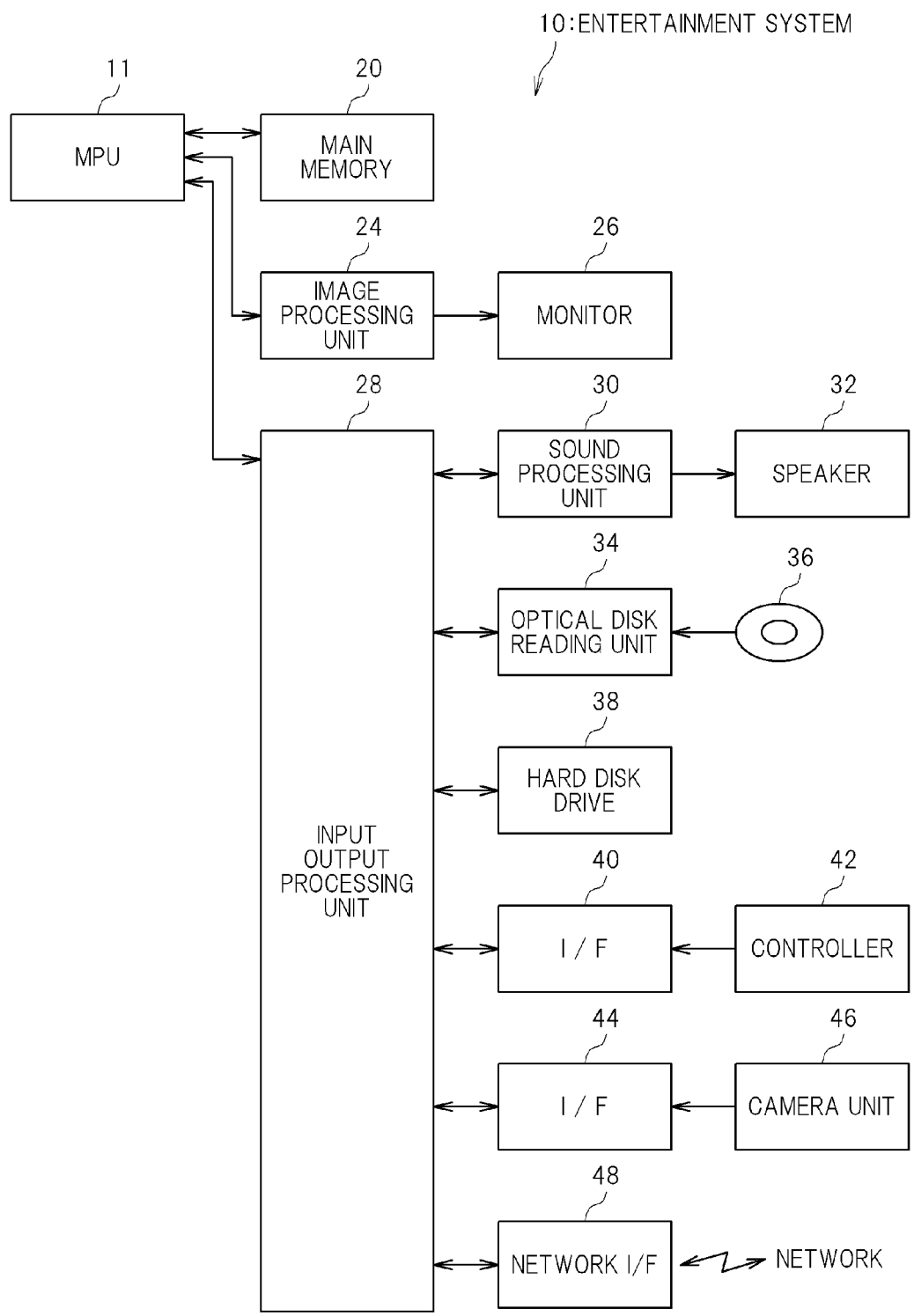
FIG. 1 is a diagram showing one example of a hardware structure of an entertainment system that is used as an image processing device according to this embodiment.

FIG. 1 is a diagram showing a hardware structure of an entertainment system (an image processing device) 10 according to this embodiment. As shown in FIG. 1, the entertainment system 10 is a computer system comprising an MPU (micro processing unit) 11, a main memory 20, an image processing unit 24, a monitor 26, an input output processing unit 28, a sound processing unit 30, a speaker 32, an optical disk reading unit 34, an optical disk 36, a hard disk drive 38, interfaces (I/F) 40, 44, a controller 42, a camera unit 46, and a network interface 48.

Figure 2:
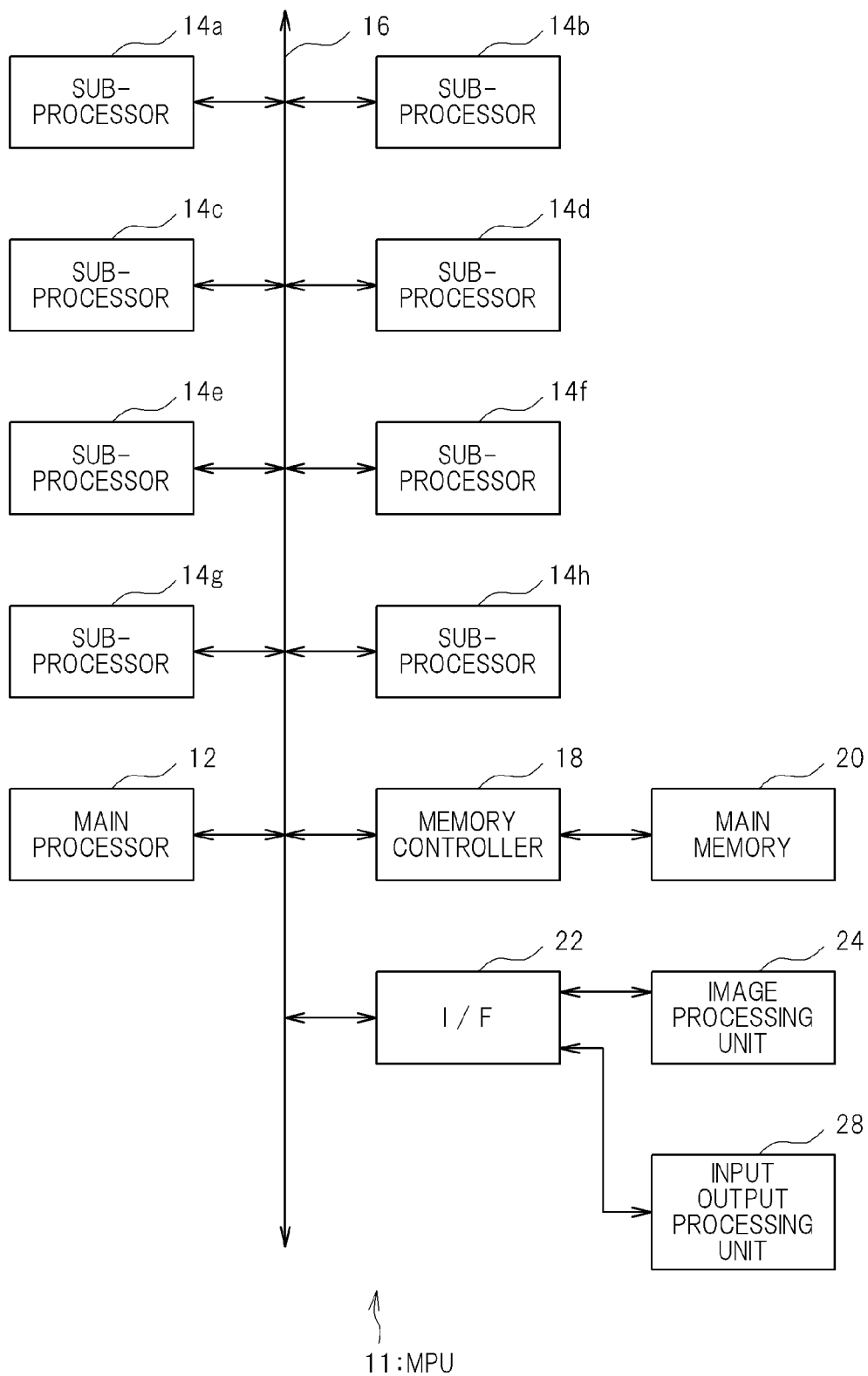
FIG. 2 is a diagram showing a structure in detail of an example of an MPU.

FIG. 2 is a diagram showing a structure of the MPU 11. As shown in FIG. 2, the MPU 11 comprises a main processor 12, sub-processors 14a, 14b, 14c, 14d, 14e, 14f, 14g, 14h, a bus 16, a memory controller 18, and an interface (I/F) 22.

The main processor 12 carries out various information processes and controls the sub-processors 14a to 14h, based on an operating system stored in a ROM (not shown) (Read Only Memory), a program and data read from the optical disk 36, such as, e.g., a DVD (Digital Versatile Disk)-ROM, or a program and data supplied via a communication network.

The sub-processors 14a to 14h carry out various information processes according to an instruction from the main processor 12, and control the respective units of the entertainment system 10 based on a program and data read from the optical disk 36, such as, e.g., a DVD-ROM, or a program and data supplied via a communication network.

The bus 16 is used to exchange an address and data between the respective units of the entertainment system 10. The main processor 12, the sub-processors 14a to 14h, the memory controller 18, and the interface 22 are connected to each other via the bus 16 for data exchange.

The memory controller 18 accesses the main memory 20 according to an instruction from the main processor 12 and the sub-processors 14a to 14h. A program and data read from the optical disk 36 or the hard disk drive 38 and a program and data supplied via a communication network are written into the main memory 20 when necessary. The main memory 20 is used as a working memory of the main processor 12 and the sub-processors 14a to 14h.

The image processing unit 24 and the input output processing unit 28 are connected to the interface 22. Data exchange between the main processor 12 or sub-processors 14a to 14h, and, the image processing unit 24 or the input output processing unit 28 is carried out via the interface 22.

The image processing unit 24 comprises a GPU (Graphical Processing Unit) and a frame buffer. The GPU renders various screen images into the frame buffer, based on image data supplied from the main processor 12 or the sub-processors 14a to 14h. A screen image rendered in the frame butter is converted into a video signal at a predetermined time and output to the monitor 26. Note that a television set for home use, for example, is used as the monitor 26.

To the input output processing unit 28, the sound processing unit 30, the optical disk reading unit 34, the hard disk drive 38, and the interfaces 40, 44 are connected. The input output processing unit 28 controls data exchange between the main processor 12 or sub-processors 14a to 14h, and, the sound processing unit 30, optical disk reading unit 34, hard disk drive 38, interfaces 40, 44, or network interface 48.

The sound processing unit 30 comprises an SPU (Sound Processing Unit) and a sound buffer. Various sound data, such as game music, game sound effects, and a message, read from the optical disk 36 or the hard disk drive 38 is stored in the sound buffer. The SPU reproduces these various sound data and outputs via the speaker 32. Note that a built-in speaker of a television set for home use, for example, may be used as the speaker 32.

The optical disk reading unit 34 reads a program and data recorded on the optical disk 36 according to an instruction from the main processor 12 or the sub-processors 14a to 14h. Note that the entertainment system 10 may be able to read a program and data stored in a computer readable information storage medium other than the optical disk 36.

The optical disk 36 is a typical optical disk (a computer readable information storage medium), such as, e.g., a DVD-ROM. The hard disk drive 38 is a typical hard disk device. Various programs or data are recorded on the optical disk 36 or the hard disk drive 38 in a computer readable manner.

Interfaces (I/F) 40, 44 are interfaces for connecting various peripheral devices, such as the controller 42 or the camera unit 46. A USB (Universal Serial Bus) interface, for example, may be used as such an interface.

The controller 42 is a general purpose operating input means for use by a user to input various operations (e.g., a game operation). The input output processing unit 28 scans the status of the respective units of the controller 42 for every predetermined period of time (e.g., 1/60th of a second), and supplies an operating status describing a result of the scanning to the main processor 12 or sub-processors 14a to 14h, so that the main processor 12 or the sub-processors 14a to 14h determine the content of an operation carried out by a user based on the operating status. Note that the entertainment system 10 is adapted to connection of a plurality of controllers 42, so that the main processor 12 or the sub-processors 14a to 14h carry out various processings based on the operating status input from the respective controllers 42.

The camera unit 46 comprises, e.g., a publicly known digital camera, and inputs a black/white, grey scaled, or colored captured image for every predetermined period of time (e.g., 1/60th of a second). Specifically, the camera unit 46 in this embodiment receives a captured image as JPEG (Joint Photographic Experts Group) image data. The camera unit 46 is mounted on the monitor 26 with the lens, for example, directed to a user, and connected to the interface 44 via a cable. Note that the camera unit 46 in this embodiment has a microphone so that outside sound is received as sound data. The network interface 48 is connected to the input output processing unit 28 via a network to relay data communication between the entertainment system 10 and another entertainment system 10 via the network.

Figure 3A:
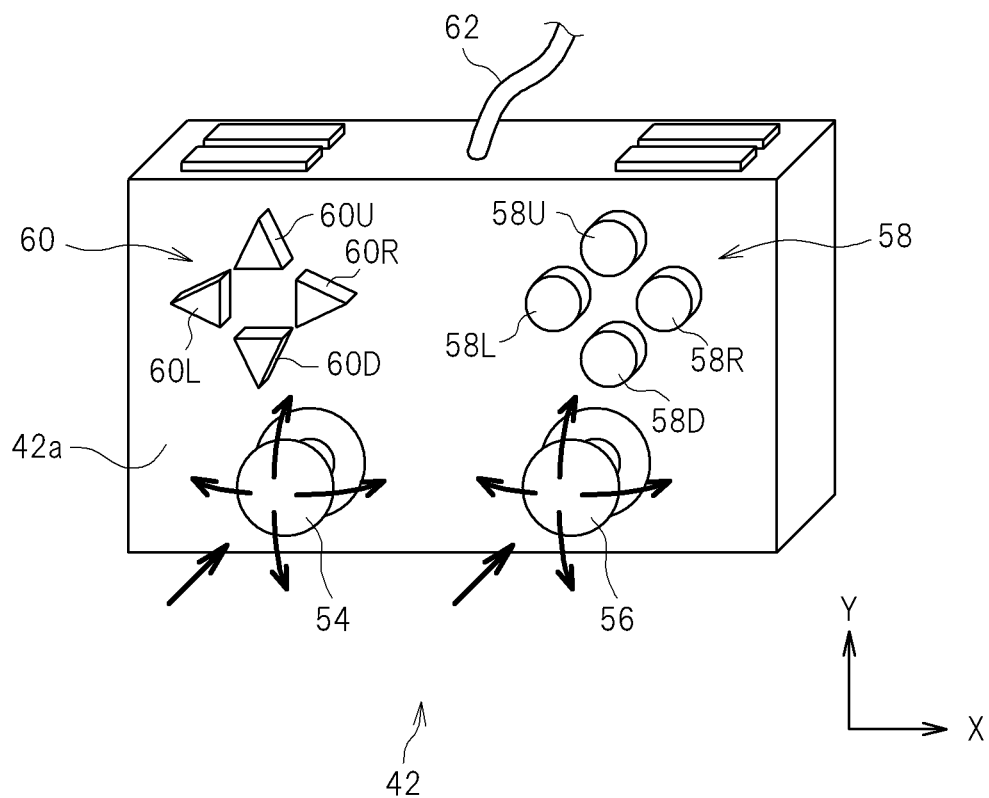
FIG. 3A is a perspective view of one example of a controller.
Figure 3B:
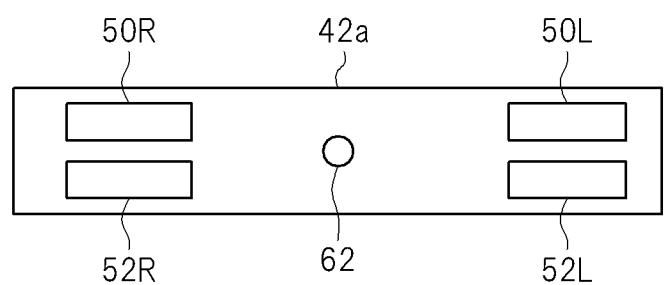
FIG. 3B is a top view of one example of the controller.

FIG. 3A is a perspective view of one example of the controller 42. FIG. 3B is a top view of one example of the controller 42. As shown in FIG. 3A, the controller 42 is connected via the controller cable 62 to the entertainment system 10, and has direction buttons 60 (a left button 60L, a right button 60R, an up button 60U, and a down button 60D) and a left operating stick 54 provided on the left side on the front surface 42a, and buttons 58 (a left button 58L, a right button 58R, an up button 58U, and a down button 58D) and a right operating stick 56 provided on the right side on the same. Further, as shown in FIG. 3B, a first left button 50L and a first right button 50R are provided on the farther lateral surface of the controller 42 near the front surface 42a on the left and right respective sides, and a second left button 52L and a second right button 52R are provided on the same surface near the rear surface on the left and right respective sides. When a user holds the enclosure of the controller 42 on the left and right sides thereof on his/her both hands, his/her left thumb is resultantly placed on the direction buttons 60 and the left operating stick 54, his/her right thumb on the buttons 58 and the right operating stick 56, at least one of his/her right index and middle fingers on the first right button 50R or the second right button 52R, and at least one of his/her left index and middle finger on the first left button 50L or second left button 52L.

The direction buttons 60, buttons 58, first left button 50L, first right button 50R, second left button 52L, and second right button 52R are each a pressure sensitive button having a pressure sensor. With these buttons pressed by a user, a digital value of 0 to 255 at 256 levels is input to the entertainment system 10 according to the pressure force. That is, based on the digital value, the entertainment system 10 can determine, for example, that a concerned button is not pressed when the digital value 0 is input from the controller 42 and that a concerned button is pressed by the maximum pressure force when the digital value 255 is input.

The left operating stick 54 and right operating stick 56 are each a stick operating member standing upright on the front surface of the enclosure of the controller 42, being adapted to inclination in all directions by a predetermined angle relative to the upright state. As shown in FIG. 3A, while the longitudinal direction of the enclosure of the controller 42 is defined as the X axial direction (the right direction in FIG. 3A is defined as the positive direction) and the depth direction of the enclosure, which is orthogonal to the X axial direction, is defined as the Y axial direction (the direction going farther from the viewer of FIG. 3A is defined as the positive direction), the posture (an operating status) of the left operating stick 54 is input to the entertainment system 10 as a digital value ranging between 0 and 255 inclusive indicating inclination (posture data (X, Y) in the X and Y axial directions. Specifically, X=127, X=128, and so froth indicate no inclination of the left operating stick 54 in the X axial direction, while X=255 indicates the maximum inclination of the left operating stick 54 in the positive direction (the right direction in FIG. 3A) of the X axis. Further, X=0 indicates the maximum inclination of the left operating stick 54 in the negative direction (the left direction in FIG. 3A) of the X axis. This is applicable to the Y axial direction. Moreover, the above description on the left operating stick 54 is similarly applicable to the right operating stick 56. In this manner, the current inclination (posture) of the left operating stick 54 and right operating stick 56 can be obtained in the entertainment system 10. The left operating stick 54 and the right operating stick 56 are each a pressure sensitive button, similar to the direction buttons 60 and the buttons 58, and can be pressed down in the axial direction of the stick.

The controller 42 has a built-in vibrator, which vibrates according to an instruction from the MPU 11.

Figure 4:
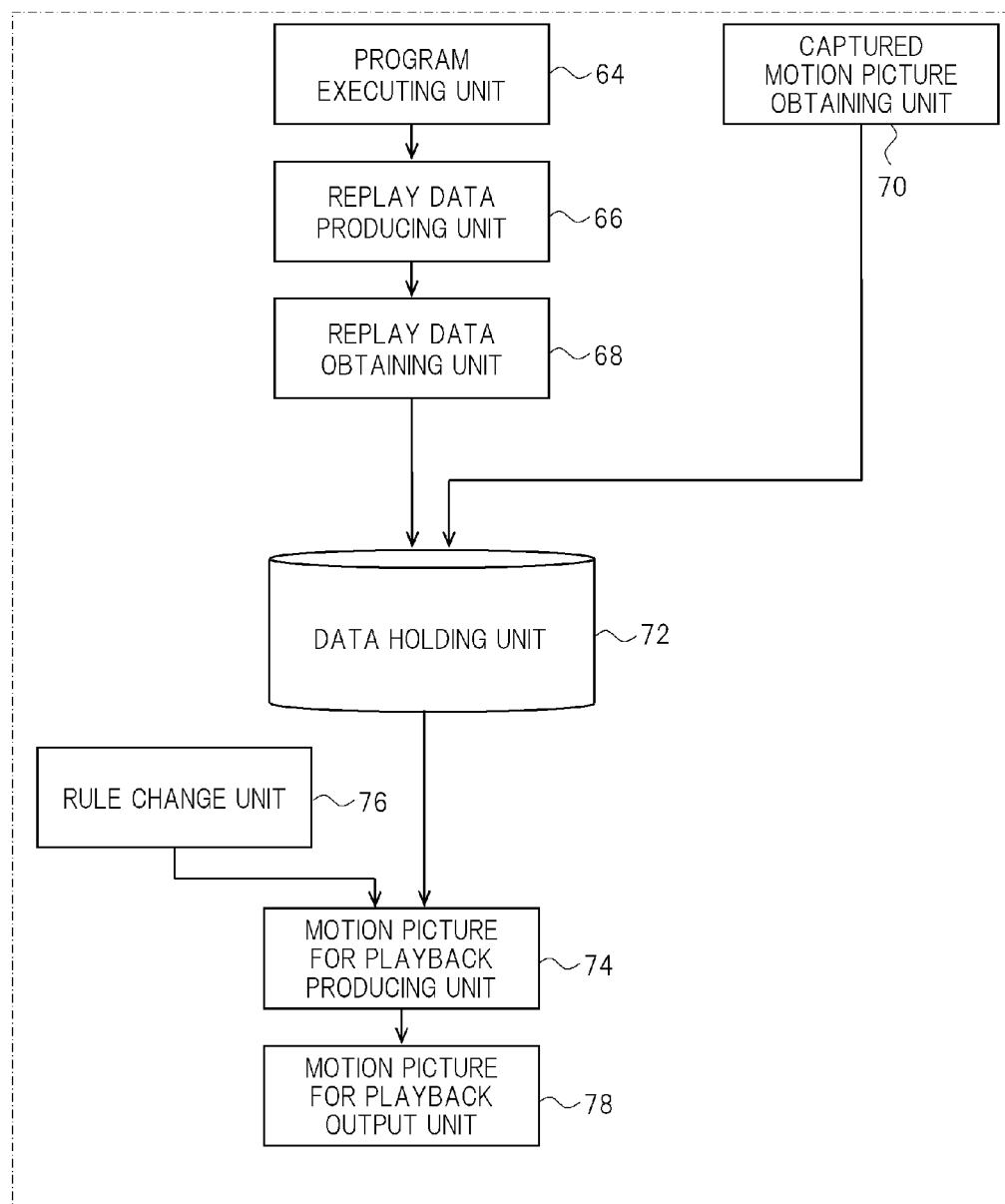
FIG. 4 is a functional block diagram showing one example of functions of an entertainment system according to this embodiment.

In the following, functions that are realized in the entertainment system 10 according to this embodiment will be described. FIG. 4 is a functional block diagram showing one example of the functions realized in the entertainment system 10 according to this embodiment.

As shown in FIG. 4, the entertainment system 10 according to this embodiment functionally comprises a program executing unit 64, a replay data producing unit 66, a replay data obtaining unit 68, a captured motion picture obtaining unit 70, a data holding unit 72, a motion picture for playback producing unit 74, a rule change unit 76, and a motion picture for playback output unit 78. However, the entertainment system 10 does not need to comprise all of these components. The data holding unit 72 can be realized mainly using a memory device, such as the main memory 20 or the hard disk drive 38, of the entertainment system 10, and other components are realized mainly using a control device, such as the MPU 11 or the image processing unit 24, of the entertainment system 10.

These components are realized by a control device, such as the MPU 11, of the entertainment system 10 by executing a program installed in the entertainment system 10, or a computer. Note that the program may be supplied to the entertainment system 10 via an information transmission medium, such as, e.g., a CD-ROM or a DVD-ROM, or via a communication network, such as the Internet.

Figure 5:
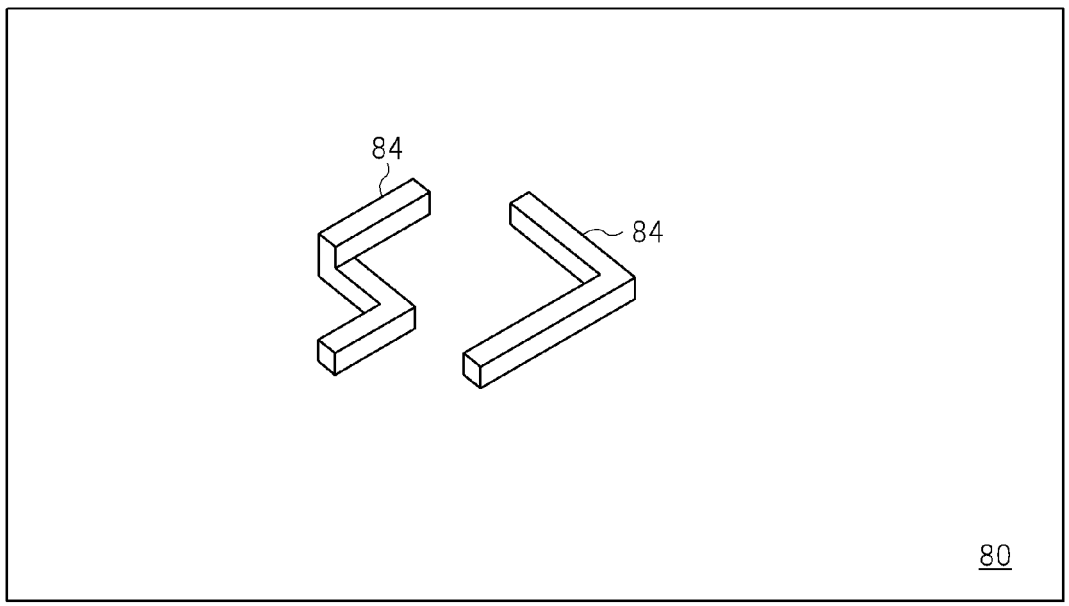
FIG. 5 is a diagram showing one example of a game screen image.
Figure 6:
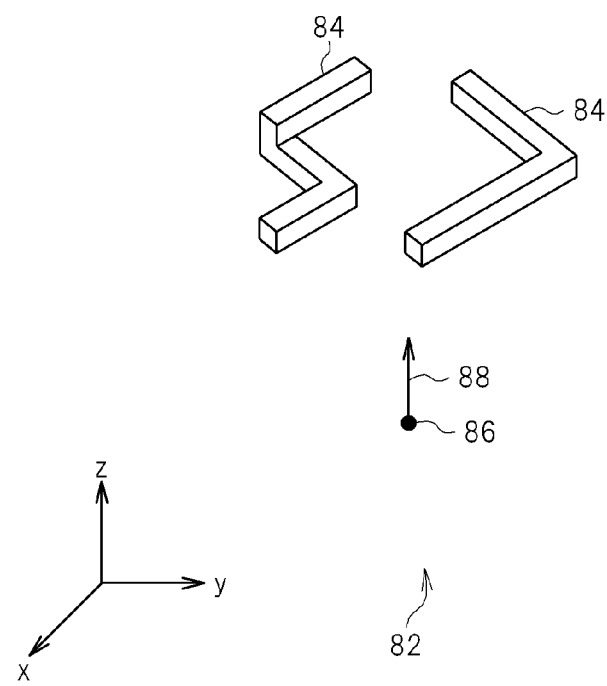
FIG. 6 is a diagram showing one example of a virtual 3D space.

The program executing unit 64 executes a program, such as a game program, installed in the entertainment system 10. In this embodiment, for example, the program executing unit 64 produces a game screen image 80 shown in FIG. 5, and outputs to the monitor 26 to display thereon. In this embodiment, the game screen image 80 shown in FIG. 5 is a visualization of a virtual 3D space 82, shown in FIG. 6, produced by the game program. As shown in FIG. 6, for example, at least one block 84 (each block 84 includes at least one polygon) is placed in the virtual 3D space 82. Then, the program executing unit 64 outputs an image showing a picture obtained by viewing from the viewpoint 86 in the viewing direction 88 as a game screen image 80 to the monitor 26 to display thereon. In this embodiment, the program executing unit 64 changes the position of the viewpoint 86 or the viewing direction 88 according to, e.g., a user operation. Obviously, the program executing unit 64 may produce, deform, move, or erase the block 84 in the virtual 3D space 82 according to a user operation.

The replay data producing unit 66 produces replay data for reproducing the status of execution of a program. In this embodiment, the replay data producing unit 66 produces replay data for reproducing the status of play of a game (e.g., a progress in playing a game at a stage) during execution of a game program corresponding to a predetermined stage of the game. Specifically, in this embodiment, the replay data producing unit 66 produces replay data that contains operation data describing content of a user operation received during execution of a game program corresponding to the above described stage. Order data indicating an order in which a user carries out an operation may be correlated to operation data. Further, operation timing data indicating a time at which a user carries out an operation (e.g., operation timing data indicating the number of frames or a period of time elapsed after start of execution of a program) may be correlated to operation data. Note that the replay data may specify a position (e.g., coordinates) of an object (the block 84, a character, and so forth) in each frame or at a certain time.

In this embodiment, the replay data producing unit 66 produces replay data on a period, e.g., from start to end of execution of the program by the program executing unit 64 (an executing period).

Further, the replay data producing unit 66 may produce replay data that contains event data describing content of an event occurring during execution of the program by the program executing unit 64 (e.g., an event in a game (more specifically, e.g., an event indicating a puzzle solved, an event indicating points are scored, an event indicating a game character laughing, and so forth) or an event received from outside (e.g., an event indicating input of a sound larger than a predetermined volume via a microphone of the camera unit 46)). Event timing data indicating a time at which a concerned event has occurred may be correlated to event data.

The replay data obtaining unit 68 obtains replay data produced by the replay data producing unit 66.

The captured motion picture obtaining unit 70 obtains a captured motion picture that is produced by an image capturing means, such as the camera unit 46, during an image capturing period including at least a part of a reproduction period in which the status of execution of a program is reproduced based on replay data. Specifically, in this embodiment, the captured motion picture obtaining unit 70 obtains a motion picture showing a user playing at the above described stage. Note that the above-described reproduction period corresponds to a period including a time at which respective operation data contained in the replay data is produced. In this embodiment, the captured motion picture obtaining unit 70 sequentially obtains a captured frame image that is produced for every predetermined period of time (e.g., every 1/60th of a second) by the camera unit 46. In this case, a captured motion picture contains at least one captured frame image. Note that the captured motion picture obtaining unit 70 may render a captured motion picture into a memory device, such as, e.g., the main memory 20 or the hard disk drive 38.

Note that the above-described image capturing period does not necessarily coincide with a program executing period. Specifically, for example, the captured motion picture obtaining unit 70 may obtain a motion picture that is captured by the camera unit 46 during a period including at least one of a period of a predetermined length after completion of a user s playing a game at the above described stage and a period of a predetermined length before a user s starting playing a game at the above described stage. In this manner, a period for capturing an image by the camera unit 46, or the image capturing period for the camera unit 46, may be a period containing and longer than a program executing period.

The data holding unit 72 holds replay data and a captured motion picture so as to be correlated to each other.

The motion picture for playback producing unit 74 produces a motion picture for playback based on replay data and a captured motion picture held in the data holding unit 72. Specifically, in this embodiment, the motion picture for playback producing unit 74 playbacks a motion picture that is based on replay data and a captured motion picture to thereby produce a motion picture for playback.

In this embodiment, the motion picture for playback producing unit 74 causes the program executing unit 64 to execute a game program at the above-described stage, and further outputs replay data held in the data holding unit 72 to the program executing unit 64. Having received the replay data from the motion picture for playback producing unit 74, the program executing unit 64 produces a replay frame image corresponding to the above-described game screen image 50 for each frame, based on the replay data received. Specifically, considering that, for example, an operating signal corresponding to replay data has been received (as a pseudo-operating signal), the program executing unit 64 produces a replay frame image for each frame. In this manner, a replay motion picture (a reproduction motion picture) for reproducing the status of playing at the above-described stage by a user, that includes at least one replay frame image is produced. The motion picture for playback producing unit 74 may instruct the program executing unit 64 to change the image production mode, so that the program executing unit 64 may produce a replay frame image that is different in manner of being displayed from that which is shown on the game screen image 50 (e.g., with different viewpoint 86 and viewing direction 88 in the virtual 3D space 82). Specifically, for example, during execution of a soccer game program, the program executing unit 64 may produce a replay frame image featuring a player object having shot, which corresponds to a game screen image 50 overlooking a player object.

The motion picture for playback producing unit 74 may produce a motion picture for playback, based on a captured motion picture and a motion picture produced based on replay data (e.g., a replay motion picture (a reproduction motion picture)), in which the replay motion picture may include at least one replay frame image (e.g., a replay image (a reproduction image) of a game program).

The rule change unit 76 changes a rule for combining a replay motion picture and a captured motion picture according to a user operation. Details on the rule change unit 76 will be described later.

Figure 7:
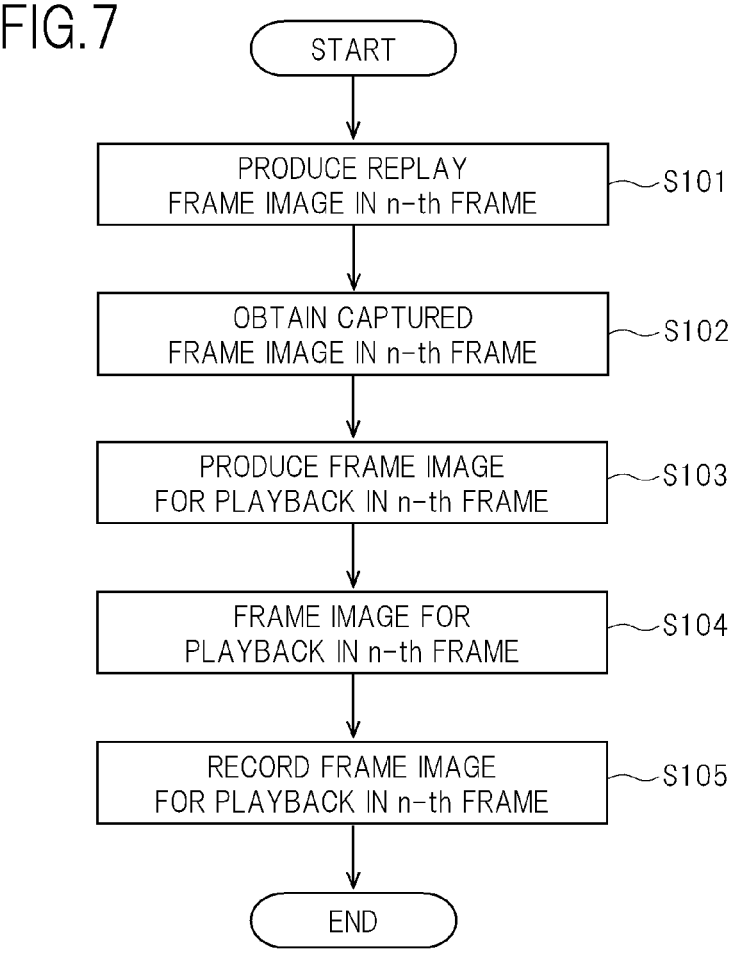
FIG. 7 is a diagram showing one example of a flow of processing carried out in an entertainment system according to this embodiment.

In the following, an example of a flow of processing that is carried out by the entertainment system 10 in this embodiment for every predetermined period of time (e.g., every 1/60th of a second) will be described referring to the flowchart shown in FIG. 7.

Note that, in this embodiment, a time to start the above-described executing period corresponds to a time to start the above-described image capturing period, and a time to end the above-described executing period corresponds to a time to end the above-described image capturing period. In the process example described below, one example of a flow of processing for an n-th frame counted from the start of the above-described executing period will be described. Note that, before start of the process described below, replay data and a captured motion picture are held in advance so as to be correlated to each other in the data holding unit 72, and the program executing unit 64 has already started execution of a game program corresponding to the stage to be reproduced as instructed by the motion picture for playback producing unit 74. Then, the motion picture for playback producing unit 74 outputs the replay data held in the data holding unit 72 to the program executing unit 64.

Initially, the motion picture for playback producing unit 74 instructs the program executing unit 64 to produce a replay frame image in an n-th frame (that is, a replay frame image at a moment after elapse of n/60 seconds after start of the executing period) (S101).

Then, the motion picture for playback producing unit 74 obtains a captured frame image in the $n^{th}$ frame (that is, a captured frame image at a moment after elapse of n/60 seconds after start of the image capturing period) held in the data holding unit 72 (S102).

Figure 8:
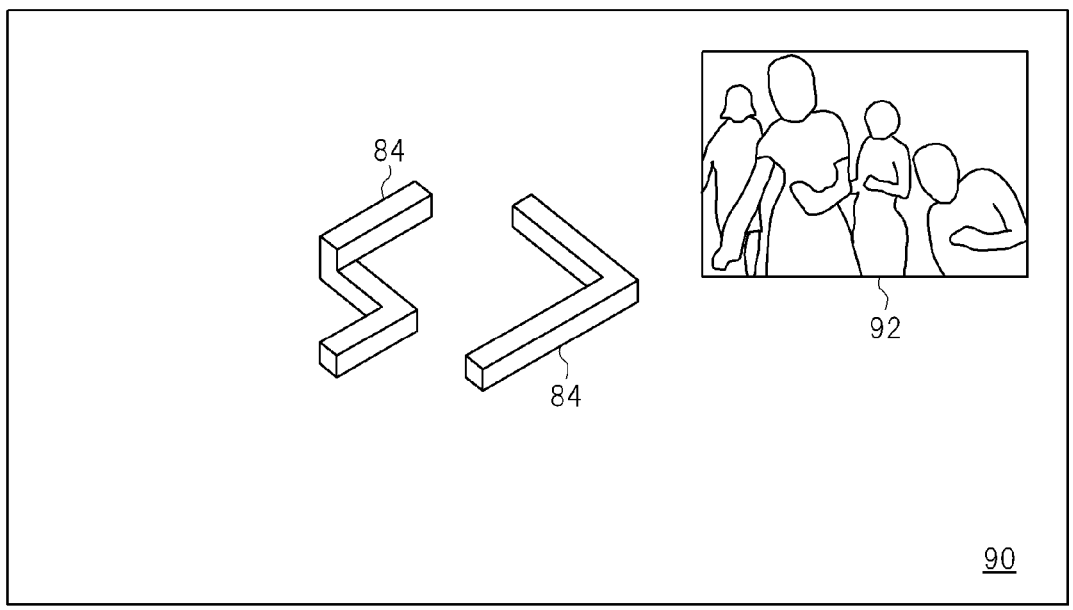
FIG. 8 is a diagram showing one example of a frame image for playback.

Then, the motion picture for playback producing unit 74 combines the replay frame image in the n-th frame and the captured frame image in the n-th frame to thereby produce a frame image for playback 90 in the n-th frame (see FIG. 8) (S103). FIG. 8 shows one example of a frame image for playback 90. Details on the process at S103 will be described later.

Then, the motion picture for playback producing unit 74 playbacks the frame image for playback 90 in the n-th frame (e.g., showing the frame image for playback 90 on the monitor 26) (S104).

Then, the motion picture for playback producing unit 74 records the frame image for playback 90 in the n-th frame in a memory device such as the main memory 20 or the hard disk drive 38 (S105). Note that the frame image for playback 90 is made correlated to, e.g., the number of frames corresponding to or data indicating a period of time elapsed after start of playback. As described above, the motion picture for playback producing unit 74 may record a motion picture to be played back to thereby produce a motion picture for playback.

The process at S101 to S105 is sequentially carried out beginning with the first frame to the last frame. As described above, in this embodiment, a motion picture for playback containing at least one frame image for playback 90 is recorded in a memory device such as the main memory 20 or the hard disk drive 38.

The motion picture for playback producing unit 74 combines a replay frame image and a captured frame image according to, e.g., a predetermined rule. Specifically, the motion picture for playback producing unit 74 may overwrite a reduced-size image 92 of a captured frame image in a predetermined area (e.g., an upper right area in a replay frame image) in a replay frame image to thereby produce a frame image for playback 90. Further, the motion picture for playback producing unit 74 may overwrite a low-quality reduced-size image of a captured frame image 92 in an area in a replay frame image to thereby produce a frame image for playback 90. Still further, the motion picture for playback producing unit 74 may set a reduced-size image of a replay frame image 92 in a lower left area and a reduced-size image 92 of a captured frame image in an upper right area to produce the frame image for playback 90. As described above, the motion picture for playback producing unit 74 combines a replay motion picture and a captured motion picture according to a predetermined rule to thereby produce a motion picture for playback.

Note that the motion picture for playback producing unit 74 may specify, according to a publicly known image processing technique, an area in a replay frame image where no program-related-image (e.g., no game-program-related-image) is shown, and overwrite a reduced-size image of a captured frame image 92 in that area to thereby produce a frame image for playback. Further, the motion picture for playback producing unit 74 may determine a color based on the distribution of pixels (e.g., color distribution) contained in a replay frame image and overwrite a reduced-size image of a captured frame image 92 that has been processed so as to be shown in that color in an area in the replay frame image to thereby produce a frame image for playback 90. Still further, the motion picture for playback producing unit 74 may determine a degree of semi-transparency based on variation of pixels (e.g., color variation) contained in a replay frame image and overwrite a reduced-size image 92 of a captured frame image that has been processed so as to be shown in semi-transparency of that degree in an area in the replay frame image to thereby produce a frame image for playback 90. In this manner, the motion picture for playback producing unit 74 combines a replay motion picture and a captured motion picture according to a rule that is determined based on the replay motion picture to thereby produce a motion picture for playback.

Further, in production of event data by the replay data producing unit 66, the motion picture for playback producing unit 74 may impart image effects based on the content of the event to a frame image for playback 90 corresponding to the time (e.g., a time of event occurrence) indicated by the event data. Specifically, in the above, the motion picture for playback producing unit 74 may enlarge the area occupied by the reduced-size image of a captured frame image 92 in the frame image for playback 90. Further, in the above, the motion picture for playback producing unit 74 may overwrite a reduced-size image of a captured frame image 92 in a replay frame image to thereby produce a frame image for playback 90. Still further, in the above, the motion picture for playback producing unit 74 may process the frame image for playback 90 by coloring, adding a blow-off, displacing, and so forth. Yet further, in the above, the motion picture for playback producing unit 74 may produce a frame image for playback 90 for slow reproduction (e.g., to produce common frame images for playback 90 for a predetermined number of frames).

Further, the motion picture for playback producing unit 74 may determine, based on a replay frame image, whether or not an event has occurred. When event occurrence is determined, predetermine image effects may be imparted to the frame image for playback 90 corresponding to the replay frame image.

Note that incoincidence between a program executing period and an image capturing period for the camera unit 46 may suggest absence of a captured frame image corresponding to a replay frame image or a replay frame image corresponding to a captured frame image. In this case, the motion picture for playback producing unit 74 may compensate for the unavailable captured frame image or replay frame image according to a predetermined rule (e.g., by using a replay frame image or a captured frame image corresponding to the last frame within the program executing period) to thereby produce a frame image for playback 90.

Further, in this embodiment, the rule change unit 76 changes a rule for combining a replay motion picture and a captured motion picture according to a user operation (e.g., receiving an operating signal indicating that a predetermined button has been pressed, and changing the rule according to the operation). Specifically, according to an operating signal, the rule change unit 76 switches between production of a frame image for playback 90 containing a reduced-size image of a captured frame image 92 and production of a frame image for playback 90 without a reduced-size image of a captured frame image 92. With the above, a user can switch between including a reduced-size image of a captured frame image 92 in a frame image for playback 90 and not including the same, while looking at a motion picture being played back by the motion picture for playback producing unit 74.

Alternatively, according to operation data, the rule change unit 76 may switch between production of a frame image for playback 90 containing a reduced-size image of a captured frame image 92 and production of a frame image for playback 90 without a reduced-size image of a captured frame image 92. With the above, a user can switch between including an image based on a captured motion picture in a frame image for playback 90 and not including the same during execution of a program by the program executing unit 64. Further, according to a user operation, the rule change unit 76 may change the position and/or size of a captured frame image in a frame image for playback 90.

In response to a request from a user, the motion picture for playback output unit 78 outputs a motion picture for playback stored in a memory device to a motion picture output server connected to the entertainment system 10 via a network so as to be correlated to the identifier of the user (e.g., a user ID or a user name). Specifically, the motion picture for playback output unit 78 uploads a motion picture for playback comprising a captured motion picture and a replay motion picture of a game combined together to, e.g., a motion picture output server that is a motion picture distribution site. With the above, a motion picture for playback output to the motion picture output server can be provided to other users, so that the other users can enjoy a replay motion picture of a game. Note that in the above, permission to view a motion picture for playback by a user can be regulated through comparison between the user ID of a user requesting the output and a user ID correlated to the motion picture for playback.

The motion picture for playback output unit 78 may output a motion picture for playback to the entertainment systems 10 of other users, and in the playback of the motion picture for playback in that entertainment system 10 in response to a request from the other user, the camera unit 46 may capture an image of the other user viewing, or appreciating, the motion picture for playback being played back to thereby produce an appreciation motion picture. Then, the entertainment system 10 may output to the entertainment system 10 of the sender side the appreciation motion picture or a combined motion picture including the appreciation motion picture and the motion picture for playback combined together. With the above, a user having produced the motion picture for playback can enjoy watching other users appreciating the motion picture for playback. Note that the entertainment system 10 may send and receive a motion picture for playback, an appreciation motion picture, or a combined motion picture via a server.

Note that the present invention is not limited to the above described embodiment.

For example, the motion picture for playback producing unit 74 may produce a replay motion picture based on replay data, and then combine the replay motion picture and a captured motion picture to thereby produce a motion picture for playback.

Further, for example, replay data may be correlated to a captured frame image. Specifically, for example, at least a part of replay data produced may be correlated to a frame number (e.g., a frame number indicating the number of frames elapsed after start of an image capturing period) or the like that indicates the order of a captured frame image contained in a captured motion picture. Then, the motion picture for playback producing unit 74 may sequentially produce a replay frame image for a respective frame based on the replay data, and combine the replay frame image produced and a captured frame image correlated to the replay data that is a base in production of the replay frame image, to thereby produce a frame image for playback 90. Further, at least a part of a captured frame image contained in a captured motion image may be correlated to an identifier of replay data (e.g., replay data indicating the position of a character), so that while sequentially doing playback the captured frame images according to the orders indicated by the frame numbers contained in the respective captured frame images, the motion picture for playback producing unit 74 combines the captured frame image which is played back and a replay frame image showing a picture in which respective characters are positioned as determined based on the replay data correlated to the captured frame image, to thereby produce a frame image for playback 90.

For example, the motion picture for playback producing unit 74 may produce a frame image for playback 90, based on a replay frame image and a captured frame image that is different at time from the replay frame image by a predetermined number of frames.

For example, the captured motion picture obtaining unit 70 may capture a plurality of captured motion pictures produced by a plurality of camera units 46. In this case, the rule change unit 76 may switch the captured motion pictures (a captured frame image) to be combined in response to a user request, so that the motion picture for playback producing unit 74 may produce a motion picture for playback based on the captured motion picture (a captured frame image).

Further, the motion picture for playback producing unit 74 may produce a motion picture for playback based on captured motion pictures and replay motion pictures respectively produced by a plurality of entertainment systems 10. Specifically, the motion picture for playback producing unit 74 combines a plurality of replay motion pictures and a plurality of captured motion pictures according to a predetermined rule to thereby produce a motion picture for playback.

The invention claimed is:

1. A non-transitory information storage medium storing instructions which are to be executed by a client computer terminal, the instructions comprising:
   instructions for executing a program in accordance with user operation data received from a user input device and generating a first plurality of frame images in accordance with a first mode to produce a motion picture for display to the user based on the program execution and user operation data;
   replay data obtaining instructions for obtaining replay data for reproducing a status of execution of the program when the program is executed, wherein the replay data include the user operation data and the replay data is produced simultaneously with producing the motion picture for display to the user;
   motion picture for playback producing instructions for generating, after obtaining the replay data, a second plurality of frame images in accordance with a second mode for producing a motion picture for playback by executing the program using the obtained replay data, wherein the first and second modes are different and the first and second plurality of frames are different such that the motion picture for playback is at a lower resolution than the motion picture for display, and that the motion picture for playback is in condition to be uploaded from the client computing terminal to a motion picture distribution server for distribution over a computer data network;
   captured motion data obtaining instructions for obtaining a captured motion picture produced during at least a part of a reproduction period in which the status of execution of the program is reproduced based on the replay data;
   instructions to produce a replay motion picture based on the replay data and the captured motion picture; and
   instructions to produce the motion picture for playback based on the replay motion picture and the captured motion picture.

2. A non-transitory information storage medium according to claim 1, wherein the instructions to produce the motion picture for playback comprise instructions to combine the replay motion picture and the captured motion picture according to a rule for producing the motion picture for playback.

3. A non-transitory information storage medium according to claim 2, wherein the instructions to produce the motion picture for playback comprise instructions to play back a motion picture that is based on the replay data and the captured motion picture to thereby produce the motion picture for playback.

4. A non-transitory information storage medium according to claim 2, wherein the rule is a predetermined rule.

5. A non-transitory information storage medium according to claim 2, wherein the rule is determined based on the replay motion picture to thereby produce a motion picture for playback.

6. A non-transitory information storage medium according to claim 2, wherein the instructions to produce the motion picture for playback further comprise changing instructions for changing the rule for combining the replay motion picture and the captured motion picture according to a user operation.

7. A non-transitory information storage medium according to claim 2, wherein the instructions to produce the motion picture for playback further comprise motion picture for playback output instructions for outputting, in response to a request from a user, the motion picture for playback so as to be correlated to an identifier of the user to a motion picture output server for outputting a motion picture.

8. A non-transitory information storage medium according to claim 1, wherein the replay data describes at least content of an operation carried out by a user.

9. A non-lransitory information storage medium according to claim 1, the instructions further comprising:
   instructions for holding the replay data and the captured motion picture in holding means so as to be correlated to each other.

10. A non-transitory information storage medium according to claim 9, wherein the image capturing period is a period longer than the reproduction period.

11. An image processing device including a client computer terminal, comprising:
    a program execution unit for executing a program in accordance with user operation data received from a user input device and generating a first plurality of frame images in accordance with a first mode to produce a motion picture for display to the user based on the program execution and user operation data;
    a replay data obtaining unit for obtaining replay data for reproducing a status of execution of the program when the program is executed, wherein the replay data include the user operation data and the replay data is produced simultaneously with producing the motion picture for display to the user;
    a motion picture for playback producing unit for generating, after obtaining the replay data, a second plurality of frame images in accordance with a second mode for producing a motion picture for playback by executing the program using the obtained replay data, wherein the first and second modes are different and the first and second plurality of frames are different such that the motion picture for playback is at a lower resolution than the motion picture for display, and that the motion picture for playback is in condition to be uploaded from the client computer terminal to a motion picture distribution server for distribution over a computer data network;
    a captured motion picture obtaining unit for obtaining a captured motion picture produced during at least a part of a reproduction period in which the status of execution of the program is reproduced based the replay data: and
    a replay motion picture obtaining unit for reproducing a replay motion picture based on the replay data and the captured motion picture,
    wherein the motion picture for playback producing unit produces the motion picture for playback based on the replay motion picture and the captured motion picture.

12. An image processing method carried out on a client computer terminal, comprising:
    executing a program in accordance with user operation data received from a user input device and generating a first plurality of frame images in accordance with a first mode to produce a motion picture for display to the user based on the program execution and user operation data;

obtaining replay data for reproducing a status of execution of the program when the program is executed, wherein the replay data include the user operation data and the replay data is produced simultaneously with producing the motion picture for display to the user;

after obtaining the replay data, generating a second plurality of frame images in accordance with a second mode for producing a motion picture for playback by executing the program using the obtained replay data, wherein the first and second modes are different and the first and second plurality of frames are different such that the motion picture for playback is at a lower resolution than the motion picture for display, and that the motion picture for playback is in condition to be uploaded from the client computer terminal to a motion picture distribution server for distribution over a computer data network;

obtaining a captured motion picture produced during at least a part of a reproduction period in which the status of execution of the program is reproduced based the replay data: and producing a replay motion picture based on the replay data and the captured motion picture, wherein the producing the motion picture for playback includes producing the motion picture for playback based on the replay motion picture and the captured motion picture.

\* \* \* \* \*